United States Patent [19]

Nemirovsky et al.

[11] Patent Number: 5,404,451
[45] Date of Patent: Apr. 4, 1995

[54] SYSTEM FOR IDENTIFYING CANDIDATE LINK, DETERMINING UNDERUTILIZED LINK, EVALUATING ADDITION OF CANDIDATE LINK AND REMOVING OF UNDERUTILIZED LINK TO REDUCE NETWORK COST

[76] Inventors: Paul Nemirovsky, 3 Bouldercrest Ct., Rockville, Md. 20850; Michael Ball, 1012 S. Mansion Dr., Silver Spring, Md. 20770; Michael Post, 24 Lexington Rd., New York City, N.Y. 10956

[21] Appl. No.: 38,756

[22] Filed: Mar. 29, 1993

Related U.S. Application Data

[63] Continuation of Ser. No. 475,880, Feb. 6, 1990, abandoned.

[51] Int. Cl.[6] .............................................. G06F 13/00
[52] U.S. Cl. ................... 395/200; 364/222.2; 364/242.94; 364/942.07; 364/DIG. 1; 370/60
[58] Field of Search .......... 395/200; 364/200, 242.94; 370/16, 17, 94.1, 94.3; 371/11.1, 11.2, 20.1, 60

[56] References Cited

U.S. PATENT DOCUMENTS

| | | | |
|---|---|---|---|
| 3,579,191 | 5/1971 | Andreae | 395/200 |
| 3,626,375 | 12/1971 | Koziol | 395/200 |
| 4,771,424 | 9/1988 | Suzuki et al. | 370/86 |
| 4,905,233 | 2/1990 | Cain et al. | 370/94.1 |
| 5,029,075 | 7/1991 | Hirasawa | 395/200 |
| 5,095,444 | 3/1992 | Motles | 395/200 |
| 5,115,495 | 5/1992 | Tsuchiya et al. | 395/200 |
| 5,163,042 | 11/1992 | Ochiai | 370/17 |
| 5,218,676 | 6/1993 | Ben-Ayed et al. | 395/200 |

Primary Examiner—Thomas C. Lee
Assistant Examiner—Moustafa Mohamed Meky
Attorney, Agent, or Firm—Kenyon & Kenyon

[57] ABSTRACT

A method for selecting the most cost-efficient configuration for backbone links in a distributed data network is disclosed. The method identifies candidate links between pairs of backbone nodes, evaluates the effect on the network of adding each candidate link to the network, and adds to the network those candidate links which produce a cost savings in the network. The method also routes data through the backbone to minimize transmission delays, and eliminates redundant lines from underutilized links, and removes from the network those links whose removal reduces the cost of the backbone.

10 Claims, 9 Drawing Sheets

```
┌─────────────── Terminal / Host Clusters ─────────────── v2.0
│ Cluster No. Design ID  V Coord  H Coord   Cluster Weight
│
│
└
     ┌─────────────────── Design Locations ─────────────────────── v2.0
Clust# Loc ID  V Coord  H Coord  Lata  St  Vir  Term  T/H Flag:  Conc BackB
  0   ALBIRM   7518     2446     476   AL        0     Y          0    0
  0   ALMONT   7692     2247     478   AL        0     Y          0    0
  0   ARLROC   7721     3448     528   AR        0     Y          0    0
  0   AZPHOE   9133     6748     666   AZ        0     Y          0    0
  0   AZTUCS   9347     6469     668   AZ        0     Y          0    0
  0   CAFRES   8669     8239     728   CA        0     Y          0    0

┌──────────── Terminal / Host Traffic ──────────── v2.0
Source: Loc ID Dev ID  Dest: Loc ID  Dev ID   Peak Byte   Profile ID
        ALBIRM   T           CALANG    H        61.5         1
        ALBIRM   T           DCWASH    H        61.5         1
        ALMONT   T           CALANG    H       209.6         1
```

Enter in peak byte traffic.
Char Mode: Replace     Page 1                    Count: 3

FIG.4

Backbone Sites — v2.2

| Loc ID | Dev | Node Num. | Cost | Avail | Exist | Chosen? Y/N | Num | T1 Site Chos? Y/N | Node Num | Switch ID | Number of Increments Pack Line |
|---|---|---|---|---|---|---|---|---|---|---|---|
| ALMONT | BB | 5 | 4000.00 | 0 | N | N | | | | BB | |
| CALANG | BB | 8 | 4000.00 | 0 | N | N | | | | BB | |
| CAOAKL | BB | 7 | 4000.00 | 0 | N | N | | | | BB | |
| COAURO | BB | 6 | 4000.00 | 0 | N | N | | | | BB | |
| ILCHIC | BB | 4 | 4000.00 | 0 | N | N | | | | BB | |
| MABOST | BB | 0 | 4000.00 | 0 | N | N | | | | BB | |
| NJTREN | BB | 1 | 4000.00 | M | N | N | | | | BB | |
| OHCINC | BB | 3 | 4000.00 | 0 | N | N | | | | BB | |
| VARICH | BB | 2 | 4000.00 | 0 | N | N | | | | BB | |

Design Switches: PageDown Key

Count: *9

Concentrators — v2.0

| Loc ID | Dev | ID Node # | Chosen Node # | Switch Type | Switch Cost | Avail (O.M) | Exist Y/N |
|---|---|---|---|---|---|---|---|
| ARLROC | LS | 2 | | S | 700.00 | 0 | N |
| CALANG | LS | 19 | | S | 700.00 | 0 | N |
| CAOAKL | LS | 6 | | S | 700.00 | 0 | N |
| COAURO | LS | 3 | | S | 700.00 | 0 | N |
| DCWASH | LS | 13 | | S | 700.00 | 0 | N |
| FLTAMP | LS | 4 | | S | 700.00 | 0 | N |
| GAATLA | LS | 1 | | S | 700.00 | 0 | N |
| ILCHIC | LS | 15 | | S | 700.00 | 0 | N |
| ILSPRI | LS | 17 | | S | 700.00 | 0 | N |
| KYLOUI | LS | 16 | | S | 700.00 | 0 | N |
| LABROU | LS | 5 | | S | 700.00 | 0 | N |
| MABOST | LS | 9 | | S | 700.00 | 0 | N |
| MOKCIT | LS | 21 | | S | 700.00 | 0 | N |
| NCCHAR | LS | 20 | | S | 700.00 | 0 | N |

Average Computed Bytes per Packet (Profile 0): 65

Design Concentrators: PageDown Key

Char Mode: Replace Page 1                Count: 14

FIG.5

——————— Chosen Concentrators ——————— v2.0

| Loc ID | Dev ID | Type | Node # | Chos # | Cost $ | FS | Avail (O,M) | Exist Y/N | Prob To BB | Delay To BB | # Lines | Load (bytes) |
|---|---|---|---|---|---|---|---|---|---|---|---|---|
| ARLROC | LS | S | 2 | 2 | 700.00 | Y | O | N | .989604 | .10205 | 16 | 1529 |
| CALANG | LS | S | 21 | 11 | 700.00 | Y | O | N | .9702 | .01258 | 8 | 2281 |
| CAOAKL | LS | S | 6 | 4 | 700.00 | Y | O | N | .9702 | .01278 | 13 | 2688 |
| COAURO | LS | S | 3 | 3 | 700.00 | Y | O | N | .9702 | .0126 | 10 | 2447 |
| GAATLA | LS | S | 1 | 1 | 700.00 | Y | O | N | .989604 | .1292 | 16 | 2612 |
| ILCHIC | LS | S | 17 | 9 | 700.00 | Y | O | N | .989604 | .14495 | 8 | 2551 |
| KYLOUI | LS | S | 18 | 10 | 700.00 | Y | O | N | .9702 | .09005 | 4 | 652 |
| NEOMAH | LS | S | 0 | 0 | 700.00 | Y | M | N | .989604 | .08186 | 6 | 1107 |
| NJTREN | LS | S | 13 | 7 | 700.00 | Y | O | N | .989604 | .01465 | 27 | 7721 |
| NYSYRA | LS | S | 12 | 6 | 700.00 | Y | O | N | .9702 | .14061 | 9 | 986 |
| OHCINC | CN | B | 9 | 5 | 450.00 | Y | O | N | .9702 | .01571 | 4 | 756 |
| OHTOLE | LS | S | 16 | 8 | 700.00 | Y | O | N | .9702 | .08112 | 5 | 544 |

Average Computed Bytes per Packet ( Profile 0): 65

Design Concentrators: PageDown Key          Count: *12

Char Mode: Replace Page 1

FIG.6

Backbone Traffic and End to End Availability — v2.1

| Source | | Destination | | Peak Byte |
|---|---|---|---|---|
| Loc ID | Device Node # | Loc ID | Device Node # | |
| CALANG | BB 4 | CALANG | BB 4 | 116.65 |
| CALANG | BB 4 | CAOAKL | BB 3 | 63.58 |
| CALANG | BB 4 | COAURO | BB 2 | 151.96 |
| CALANG | BB 4 | NJTREN | BB 0 | 589.64 |
| CALANG | BB 4 | OHCINC | BB 1 | 548.73 |
| CAOAKL | BB 3 | CALANG | BB 4 | 98.77 |
| CAOAKL | BB 3 | CAOAKL | BB 3 | 193 |
| CAOAKL | BB 3 | COAURO | BB 2 | 102.19 |
| CAOAKL | BB 3 | NJTREN | BB 0 | 470.82 |
| CAOAKL | BB 3 | OHCINC | BB 1 | 408.22 |
| COAURO | BB 2 | CALANG | BB 4 | 37.99 |
| COAURO | BB 2 | CAOAKL | BB 3 | 183.01 |
| COAURO | BB 2 | COAURO | BB 2 | 173.25 |
| COAURO | BB 2 | NJTREN | BB 0 | 368.34 |
| COAURO | BB 2 | OHCINC | BB 1 | 654.69 |
| NJTREN | BB 0 | CALANG | BB 4 | 368.96 |
| NJTREN | BB 0 | CAOAKL | BB 3 | 798.18 |
| NJTREN | BB 0 | COAURO | BB 2 | 317.91 |

Char Mode: Replace Page 1    Count: 18

```
─────── Backbone Links/Channels ───────                                    v2.1
┌── Source ──┐ ┌─ Destination ─┐                Speed    # of Total
Loc ID Dev Node # Loc ID Dev Node# Chos? Link ID (kb/sec) Lines Util  Cost $
CALANG  BB         CAOAKL BB         Y    ATT      56      1   .17   1985.68
CALANG  BB         COAURO BB         Y    ATT      56      1   .11   3220.75
CALANG  BB         NJTREN BB         Y    ATT      56      1   .21   6059.73
CALANG  BB         OHCINC BB         N    ATT      56      0    0    4818.88
CAOAKL  BB         COAURO BB         N    ATT      56      0    0    3406.89
CAOAKL  BB         NJTREN BB         N    ATT      56      0    0    6264.95
CAOAKL  BB         OHCINC BB         Y    ATT      56      1   .12   5052.33

────── T1 Backbone Links/Channels ──────                                   v2.1
┌── Source ──┐ ┌─ Destination ─┐                Speed    # of Total
Loc ID Dev Node # Loc ID Dev Node# Chos? Link ID (kb/sec) Lines Util  Cost $
```

Design link Table: PageDown Key

Char Mode: Replace Page 1          Count: 7

FIG.9

SYSTEM FOR IDENTIFYING CANDIDATE LINK, DETERMINING UNDERUTILIZED LINK, EVALUATING ADDITION OF CANDIDATE LINK AND REMOVING OF UNDERUTILIZED LINK TO REDUCE NETWORK COST

This application is a continuation of application Ser. No. 07/475,880, filed on Feb. 6, 1990, now abandoned.

FIELD OF THE INVENTION

This invention relates generally to distributed data communication networks and, more specifically, to a method for selecting the most cost-efficient configuration for backbone links in a distributed data communication network.

BACKGROUND OF THE INVENTION

The design of distributed data network topologies has been practiced for many years. The need for a comprehensive method for constructing a distributed data communication network results from the complexity of such a system. A distributed data communication network is a hierarchical system of hardware components arranged to connect each hardware device, directly or indirectly, to every other device. At the lowest level in the hierarchy are user terminals or host devices, which form part of the local access network. These terminals are linked to one or more concentrators, which are statistical multiplexers with several low data rate input data lines and fewer high data rate output data lines. The concentrators form the second level of the network hierarchy and, together with the terminals, form the local access network.

The concentrators, which may be connected to other concentrators in a hierarchical fashion, are ultimately connected to the backbone, which forms the highest level in the network hierarchy. The backbone consists of high data capacity lines, or backbone links, that terminate at backbone nodes. A backbone node consists of one or more devices including switching devices for routing traffic within the backbone. Data traffic from the concentrators enters the backbone at the backbone nodes via the switches. A collection of terminals and associated concentrators are aggregated into a cluster and the devices in the cluster all connect to one or more switches at a single backbone node. More than one cluster may be associated with a single backbone node.

The backbone links can be conventional 56 kilo-bit per second data lines or fiber optic T1 lines effectively comprising 24 56 k lines. T1 lines offer lower cost per unit capacity, while multiple 56 k lines offer higher reliability through redundancy than a single T1 line. A well designed backbone will frequently require use of both T1 lines and 56 k lines to achieve required levels of reliability and performance at the lowest possible cost. Some of the existing backbone link configuration methods design backbones based on T1 lines, while others use 56 k lines. None of the existing methods are capable of designing a backbone based on a combination of T1 and 56 k lines. The invention described herein overcomes the deficiencies of the existing methods with a system that permits the configuration of a hybrid backbone incorporating both T1 and 56 k lines as backbone links. The invention also allows the use of three alternative initial network topologies.

SUMMARY OF THE INVENTION

The present invention is directed to a method used to select backbone links in a distributed data network that overcomes the limitations of the prior art. More specifically, the invention is composed of a personal computer-based software tool used to aid in the selection of backbone links between specified backbone nodes in distributed data communication networks that make use of equipment provided by Telenet Communications Corporation as well as similar equipment from other vendors. These networks include the Telenet Public Data Network, private networks that employ Telenet equipment and hybrid networks that contain both privately-owned components and public data network equipment.

The invention selects a set of backbone links to meet performance requirements in the least costly manner. It uses as inputs backbone cluster locations and data traffic between those clusters. The method can generate a set of candidate links using one of two methods or can accept a set of candidate links specified by the user. The method is also capable of integration into a global network optimization method. The user can also exercise significant control over the configuration process by specifying the values of important parameters.

The above is a brief discussion of some of the prior art and features of the invention. Other advantages of the invention can be gleaned from the detailed discussion of the preferred embodiment that follows.

DETAILED DESCRIPTION OF THE PREFERRED EMBODIMENT

Figure 1:
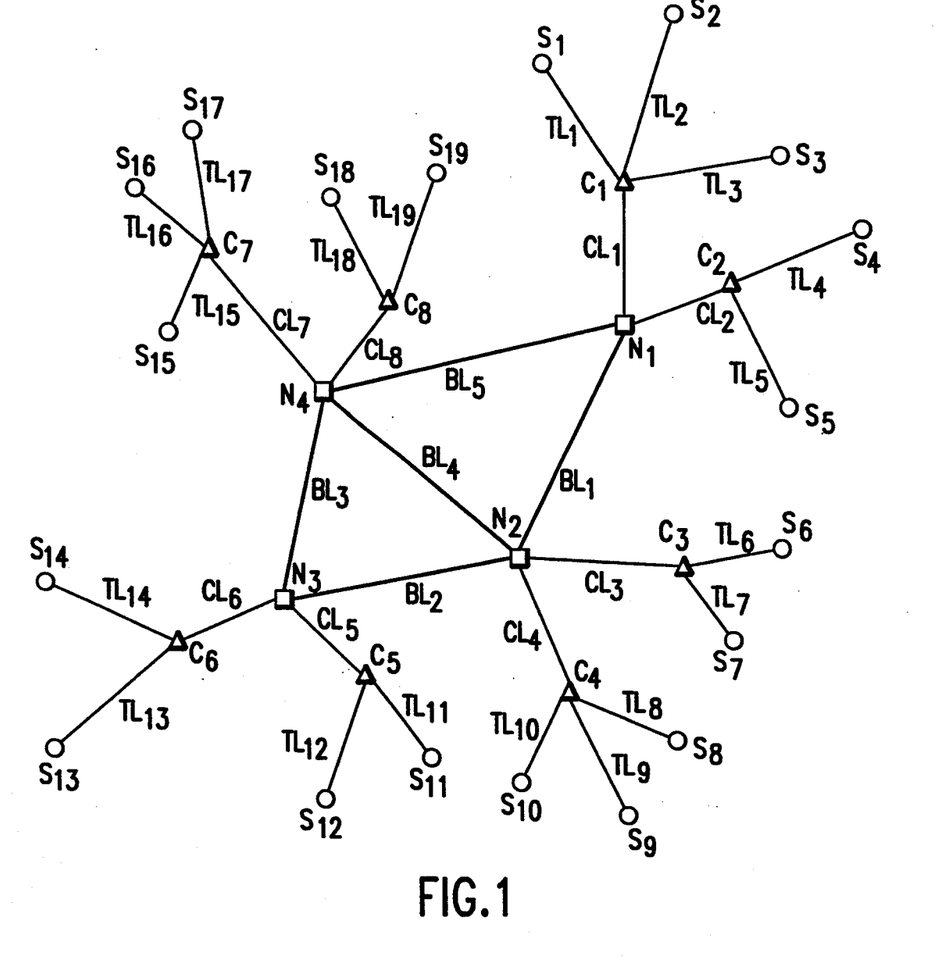
FIG. 1 is a diagram depicting a distributed data communications network comprising terminals, concentrators, and backbone nodes and the data line links connecting those devices.

In describing an illustrative embodiment, it is helpful in conveying the principles of the present invention to consider the specific network depicted in FIG. 1. Although this network is less complex than those encountered in practice, the small size of the network allows for brevity of description without loss of generality. The network consists of a set of interconnected data terminals $S_1$–$S_{19}$; these can be a variety of data terminals. The terminals are connected to concentrators $C_1$–$C_8$ which are statistical multiplexers such as one of the Telenet Communications Corporation model number TP 3000 series multiplexers. The concentrators are in turn connected to backbone nodes $N_1$ to $N_4$; the backbone nodes contain data switches such as a Telenet Communications Corporation TP4/III series switch.

The links $TL_1$–$TL_{19}$ between the terminals and the concentrators are data lines leased from local telephone service providers, as are the links $CL_1$–$CL_8$ between the concentrators and backbone nodes. The backbone nodes are connected by backbone data link lines $BL_1$–$BL_5$, which are high-volume leased data lines such as T1 fiber optic lines leased from a long-distance telephone service provider such as U.S. Sprint and conventional 56 k lines from a provider such as AT&T. The backbone nodes N and the backbone links BL collectively form the backbone of the data communications network. The terminals S, concentrators C, and data links TL and CL collectively form the local access network. Data is transmitted between the terminals S through the backbone and the local access network. The amount of data which flows per unit time through the network from one terminal to another terminal is the traffic volume TS between the terminals.

The invention is a method for determining the least-cost set of backbone links BL based on a set of backbone node locations N and traffic volumes TR from the clusters located at those backbone nodes.

Figure 3:
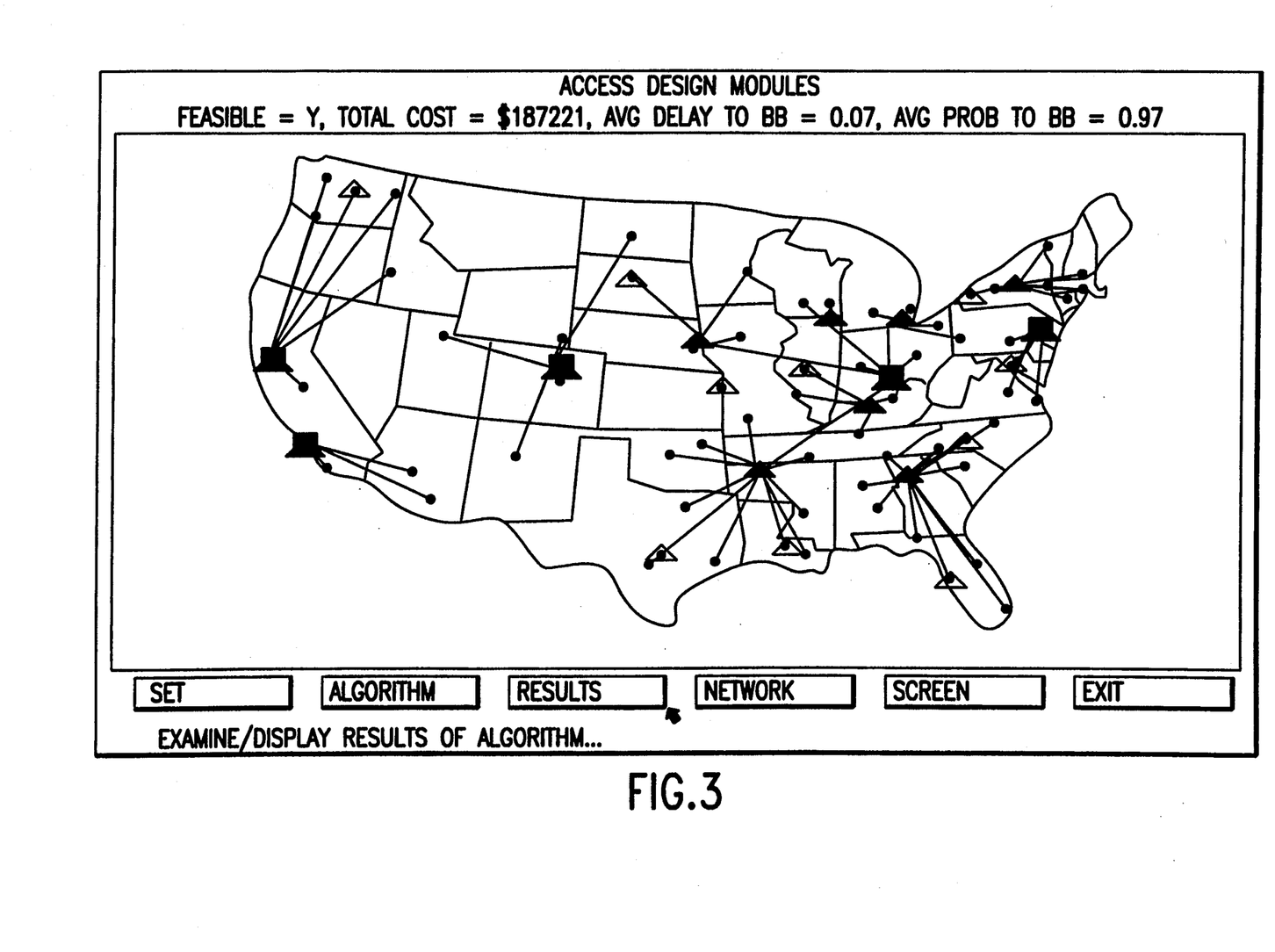
FIG. 3 is a diagram depicting a set of backbone clusters used as the basis for an example of the method's operation.

The hardware components shown schematically in FIG. 3 can represent a variety of hardware devices. Each terminal $S_i$ can also represent a virtual terminal composed of an aggregate of more than one physical terminal. In general, a single physical location may have more than one hardware device. Similarly, a backbone node $N_i$ can consist of more than one hardware device, which can have one or more switches. A collection of terminals and associated concentrators are aggregated into a cluster R and the devices in the cluster all connect to one or more switches at a single backbone node. More than one cluster R may be associated with a single backbone node. For example, in FIG. 1 concentrator $C_3$ and its associated terminals could comprise one cluster associated with a switch at node $N_2$ and concentrator $C_4$ and its terminals could comprise another cluster associated with another switch at node $N_4$. The location of a cluster's switch defines the "location" of a cluster. The links CL, TL, and BL can be analog or digital communications lines.

In order to configure the network, the locations of the backbone clusters R and the traffic volume TR between the clusters must be known. The locations of the clusters R in the network can be fixed in a two-axis coordinate system by specifying their locations in standard AT&T V,H coordinates or as area code/exchange locations. The traffic volumes TR between the clusters R can be specified in the form of bytes/second, packets/second, or calls/second. The traffic from cluster $R_i$ to cluster $R_j$ is $TR_{ij}$.

Figure 2:
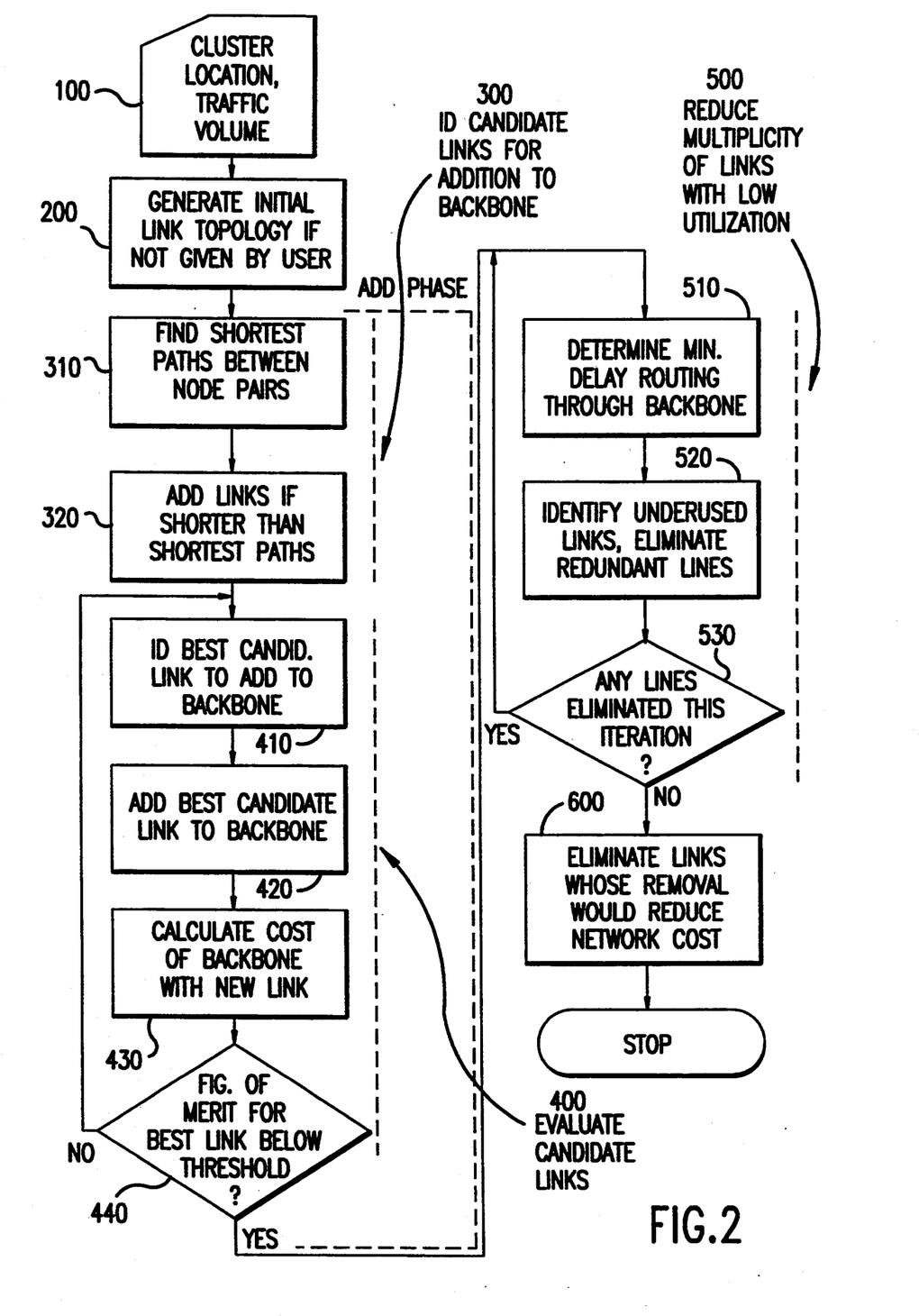
FIG. 2 is a flow chart diagram of the steps of the invention.

The logical flow of the method is illustrated schematically in FIG. 2. In the first step 100 the required input information is supplied. The next step, as shown in step 200 of FIG. 2, is to establish an initial, minimal backbone link topology. The user can supply the initial topology or the method can generate it using one of two techniques. The first technique for generating an initial topology employs Kruskal's Algorithm for finding a minimum spanning tree. This technique is well known. The second technique is a pq-median based topology.

By either technique, the result is an initial, minimal set of backbone links which, although they connect all of the backbone cluster locations, do not necessarily do so in the most efficient manner.

The next step of the method is an add phase in which other links are considered for addition to the minimal backbone link topology established in the first step. The method first identifies a set of candidate links for addition to the network, as shown in step 300 of FIG. 2. To identify candidate links, the method first determines the shortest path between each pair of backbone clusters along the links of the initial topology using the standard technique of Floyd's Algorithm. The method then determines the length of a direct link between each pair of clusters and compares the direct length to the shortest path in the initial topology. The set of candidate additional links are all those direct links for which the ratio of direct length to shortest existing path is less than a specified value less than 1.

As shown in step 400 of FIG. 2, the method next evaluates each of the candidate links for inclusion in the backbone, with the object of constructing the lowest-cost backbone. For each candidate link, the method determines how much its inclusion in the backbone would reduce the shortest paths between all of the pairs of nodes. This is an iterative evaluation process. In each iteration, the method determines a figure of merit for each candidate link and adds that candidate link with the highest figure of merit to the backbone. The figure of merit FM is determined as follows:

$$FM = \Sigma_{i,j} = TR_{i,j}[D_{k-(i,j)} - D_{k+(i,j)}]$$

where $TR_{i,j}$ is the traffic between clusters $R_i$ and $R_j$, $D_{k+(i,j)}$ is the shortest path distance between $R_i$ and $R_j$ with candidate link k in the network and $D_{k-(i,j)}$ is the shortest path distance between the clusters without k in the network. The shortest path with and without the candidate link is determined using the incremental shortest path algorithm of Murchland, Dionne, and Florian. The best candidate link added to the backbone in one iteration becomes part of the backbone for purposes of evaluating candidate links in the next iteration.

In each iteration, the method calculates the cost of the backbone. The cost of the backbone is the sum of the cost of its constituent links. Each link is composed of one or more lines leased from a long-distance telephone service provider. The cost of leasing each line is determined from the provider's tariff for the type of line and the distance between the endpoints of the line. The number of lines required in each link, which is the link's multiplicity, is determined by the volume of traffic which must be carried on that link and the capacity of individual lines.

The method continues to evaluate candidate links and add the link with the highest figure of merit until the figure of merit for the best candidate link falls below a user-specified threshold. The method then determines which of the prior iterations produced the lowest-cost backbone. The lowest-cost backbone is not necessarily the one produced by the addition of the best candidate link in the last iteration.

In the next phase of the method, as shown in step 500 of FIG. 2, the multiplicity of links with low utilization is reduced. The traffic is routed through the network to produce the minimum delay between transmitting data from a source node and receiving the data at a target node. The method then identifies those links which have a lower utilization rate (ratio of traffic routed through the link to link data capacity) than a user-specified minimum utilization threshold and eliminates one or more lines from that link so that the link's utilization exceeds the minimum utilization threshold. The method establishes minimum.-delay routing and eliminates unnecessary lines iteratively until no more lines can be eliminated.

The next phase in the method of the invention, as shown in step 600 of FIG. 2, is a drop phase. In this phase, the method reevaluates lines to eliminate unnecessary lines. In the process described above, the method selects T1 lines and/or standard 56 k lines to produce an optimum backbone.

Figure 4:
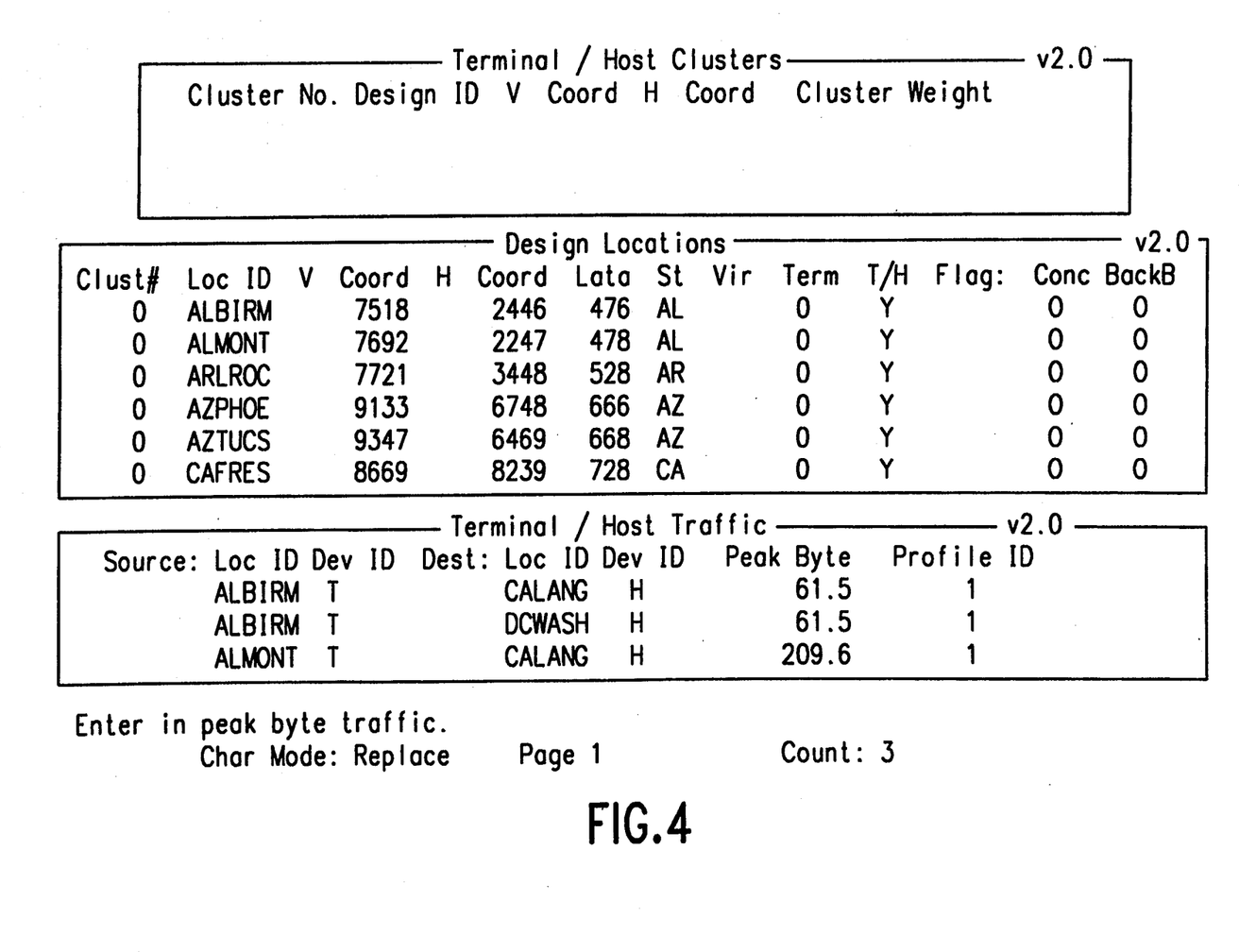
FIG. 4 presents tabular information about the some of the terminals of the network shown in FIG. 3.
Figure 5:
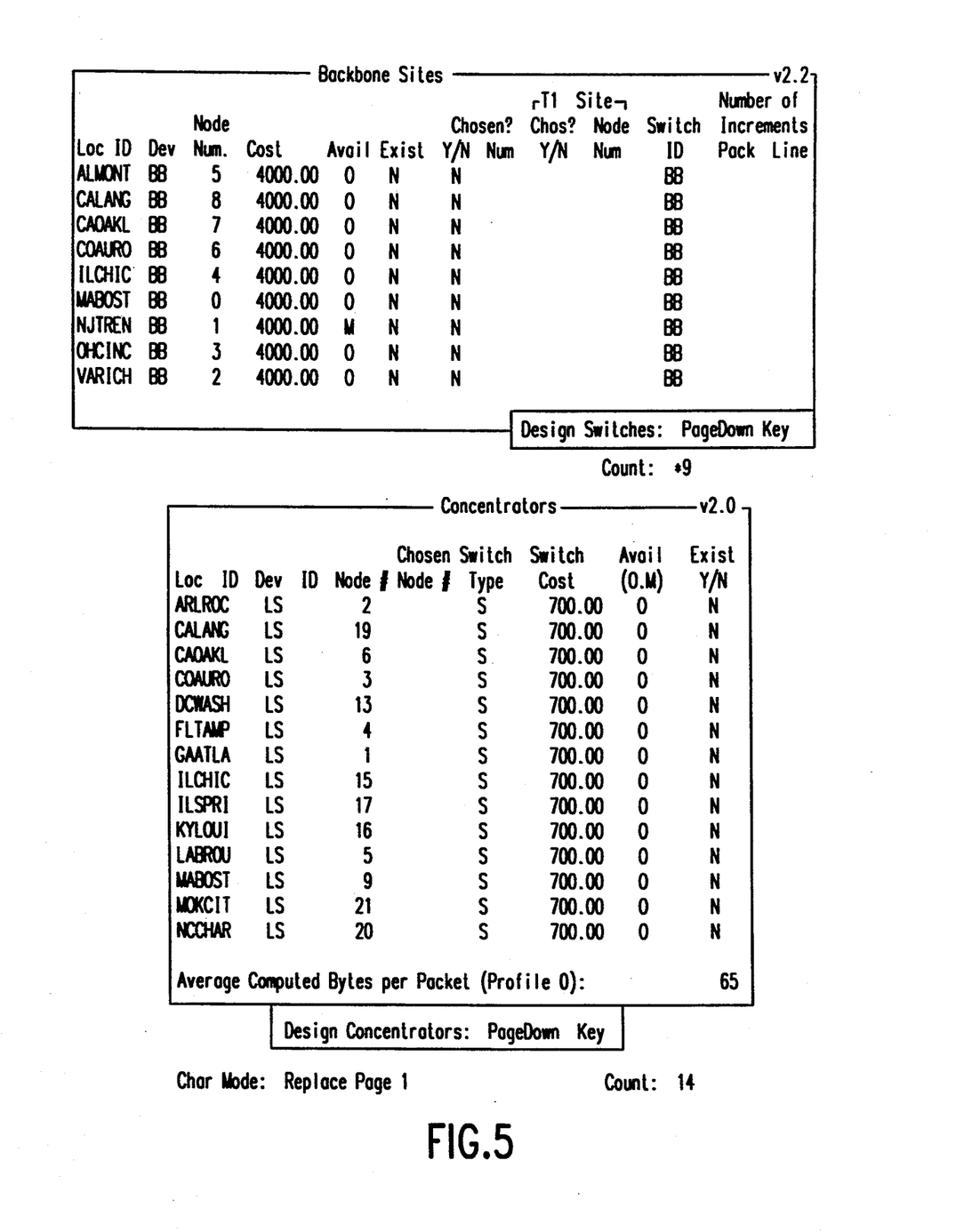
FIG. 5 presents tabular information about the concentrators and backbone clusters of the network shown in FIG. 3.
Figure 6:
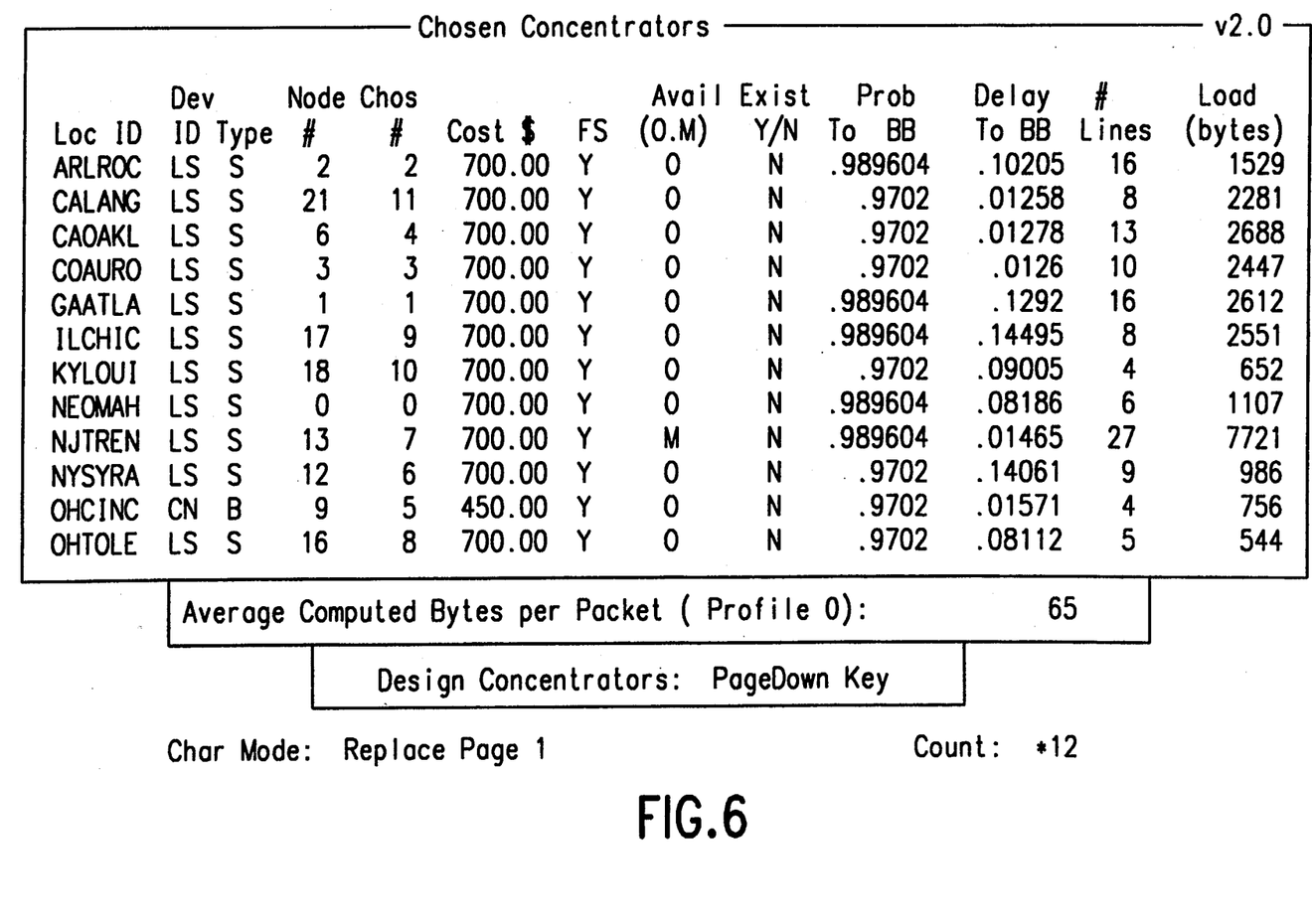
FIG. 6 presents additional tabular information about the concentrators of the network shown in FIG. 3.
Figure 7:
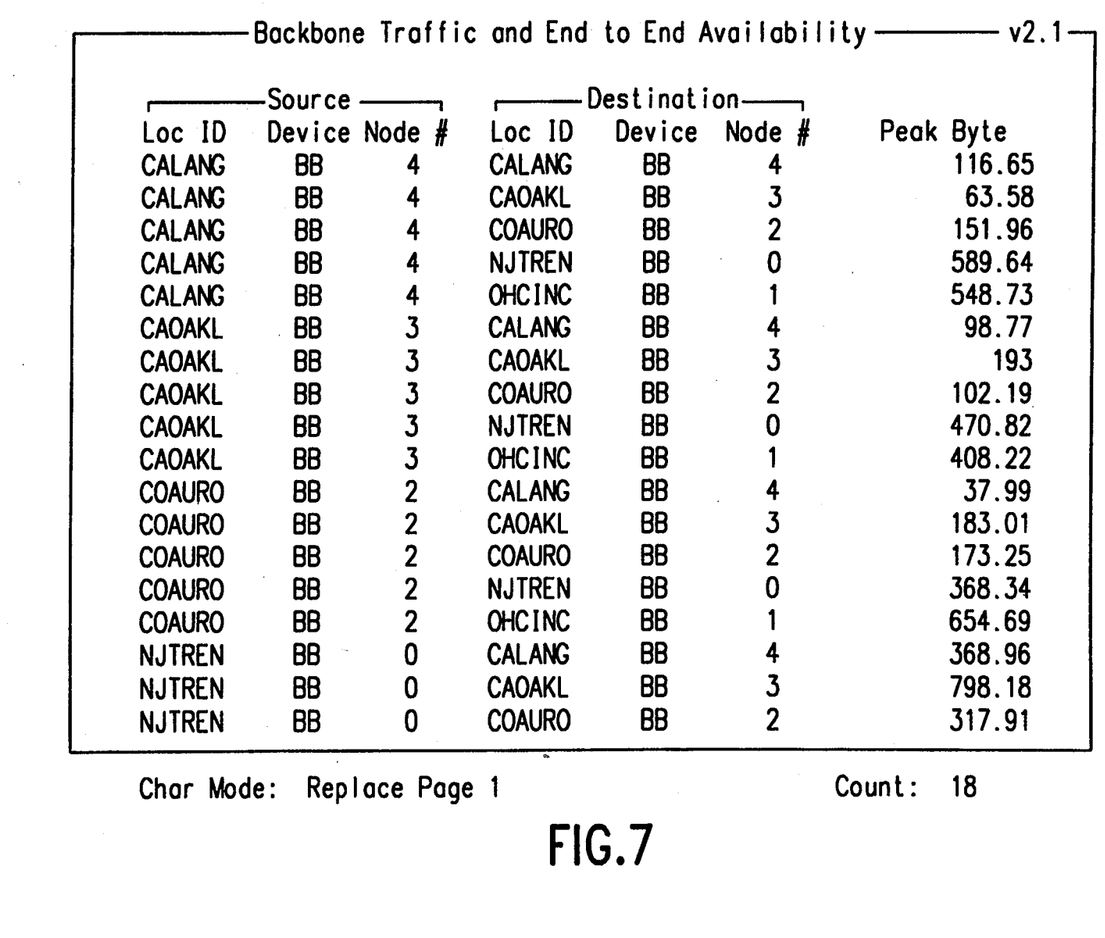
FIG. 7 presents tabular information about data traffic between backbone nodes in the network shown in FIG. 3.

The operation of the method can be illustrated with an example. The example presented here is based on the network configuration shown in FIG. 3. Information about several of the terminals in the network is presented in tabular form in FIG. 4. Information about the concentrators and the backbone nodes is presented in FIG. 5 and FIG. 6. Information about the data traffic between backbone nodes is presented in FIG. 7.

Figure 8:
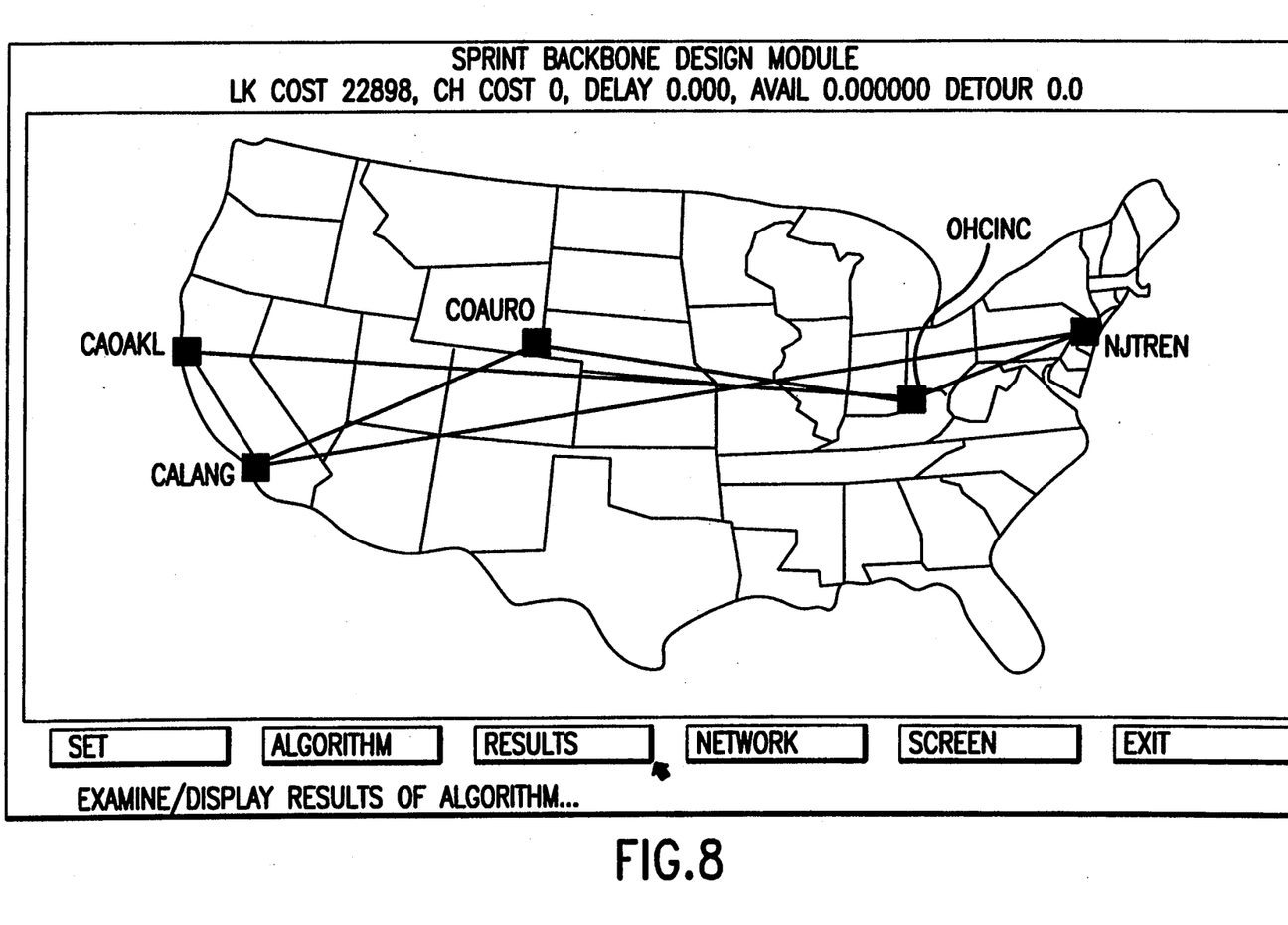
FIG. 8 is a diagram depicting the network of FIG. 3 in its final topology as configured by the method.
Figure 9:
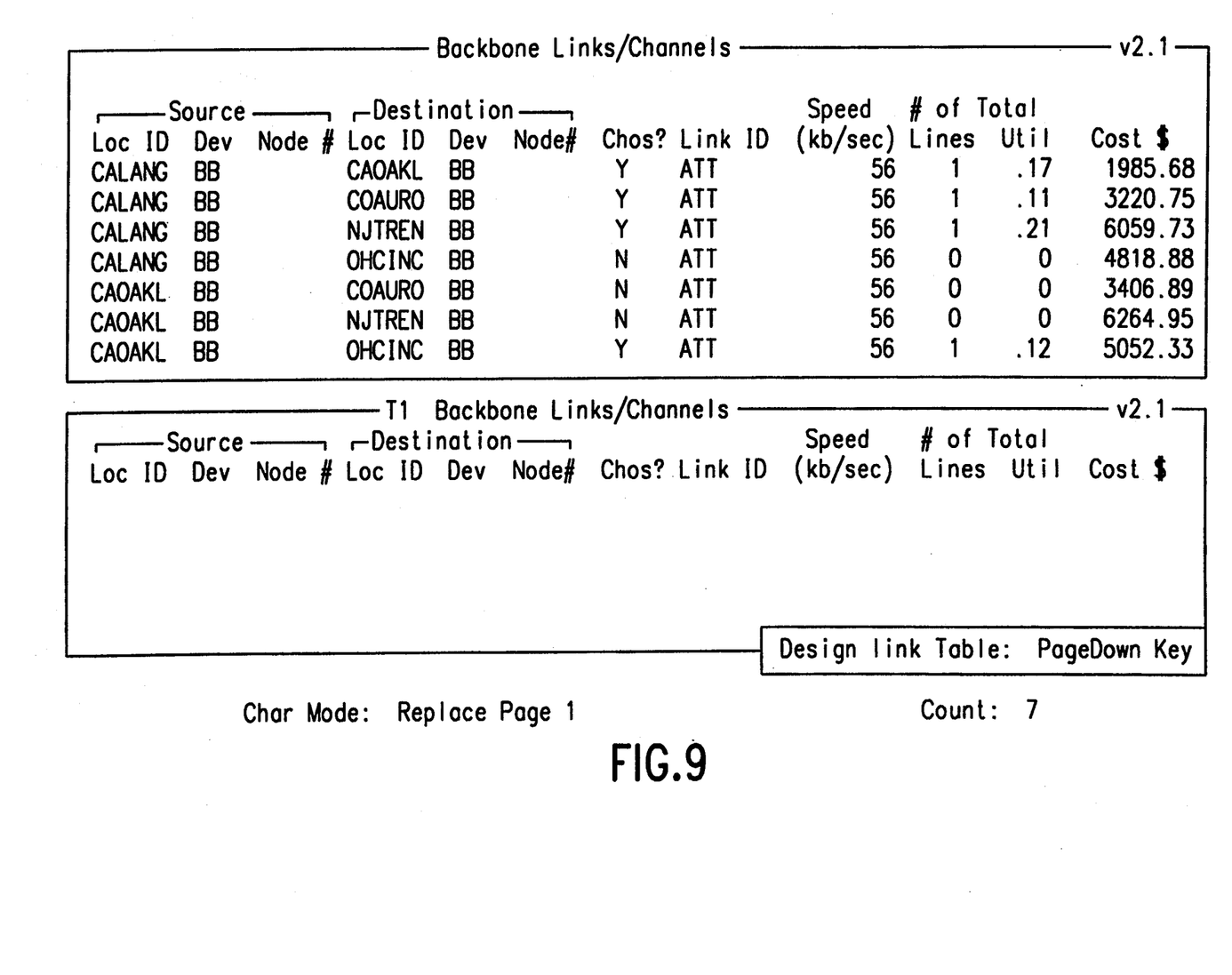
FIG. 9 is a tabular description of the backbone link topology produced by the method, corresponding to the topology shown graphically in FIG. 8.

The final network configuration produced by the method in this example is shown in FIG. 8. This configuration is also shown in tabular format in FIG. 9

The preferred embodiment of the invention described above represents one desirable, workable embodiment of the invention. It is to be understood that the methodology described herein is not limited to specific forms disclosed by way of example and illustration, but may assume other embodiments and methods limited only by the scope of the appended claims and their equivalents.

What is claimed is:

1. A computer implemented method for constructing a data communication network having a number of terminals comprising:
    i) backbone nodes for routing data traffic within a backbone; and
    ii) a plurality of first links connecting the backbone nodes; said method comprising steps of:
    (a) finding a shortest path between pairs of said backbone nodes;
    (b) identifying a candidate link between each pair of backbone nodes for which a length of said candidate link is shorter than the shortest path between the pair of backbone nodes;
    (c) evaluating an effect on the network of adding each candidate link to the network and adding those candidate links which reduce a cost of the network;
    (d) determining routing paths along said first links which produce a minimum delay for traffic between said backbone nodes and reducing a capacity of first links that are underutilized; and
    (e) evaluating an effect of removal of a first link on the network and removing the first link if the effect of removal of the first link is to reduce the cost of the network.

2. The method for constructing a data communication network according to claim 1 further comprising repeating steps (a) through (e) and selecting a lowest cost system to transmit data between said terminals.

3. The method according to claim 1 for constructing a data communication network wherein said backbone nodes include data switches.

4. The method for constructing a data communication network according to claim 1 wherein said first links are high volume data lines.

5. The method for constructing a data communication network according to claim 4 wherein said high volume data lines are fiber optic lines.

6. The method for constructing a data communication network according to claim 1 wherein said step of evaluating and adding candidate links to the network comprises identifying a best candidate link to add to the network, adding the best candidate link to the network, calculating the cost of the network with the added best candidate link, and repeating the step until a savings produced by the addition of the best candidate link is below a specified threshold.

7. A computer system for constructing a data communication network having a number of terminals comprising:
    i) backbone nodes for routing dam traffic within the backbone; and
    ii) a plurality of first links connecting the backbone nodes; said computer system including:
    (a) means for finding a shortest path between pairs of said backbone nodes;
    (b) means for identifying a candidate link between each pair of backbone nodes for which a length of said candidate link is shorter than the shortest path between the pair of backbone nodes;
    (c) means for evaluating the effect on the network of adding each candidate link to the network and adding those candidate links which reduce a cost of the network;
    (d) means for determining routing paths along said first links which produce a minimum delay for traffic between said backbone nodes and reducing a capacity of first links that are underutilized; and
    (e) means for evaluating an effect of removal of a first link on the network and removing the first link if the effect of removal of the first link is to reduce the cost of the network.

8. The computer system for constructing a data communication network to claim 7 wherein said backbone nodes include data switches.

9. The computer system for constructing a data communication network according to claim 7 wherein said first links are high volume data lines.

10. The computer system for constructing a data communication network according to claim 9 wherein said high volume data lines are fiber optic lines.

* * * * *

UNITED STATES PATENT AND TRADEMARK OFFICE
CERTIFICATE OF CORRECTION

PATENT NO. : 5,404,451
DATED : April 4, 1995
INVENTOR(S) : Paul Nemirovsky et al It is certified that error appears in the above-indentified patent and that said Letters Patent is hereby corrected as shown below:

| Column | Line | |
|--------|------|---|
| 2 | 42 | After "about" delete "the". |
| 6 | 28 | Change "dam" to --data--. |

Signed and Sealed this

Twenty-fifth Day of July, 1995

Attest:

BRUCE LEHMAN

*Attesting Officer*      *Commissioner of Patents and Trademarks*